United States Patent [19]
Holler et al.

[11] 3,836,689
[45] Sept. 17, 1974

[54] ELECTRIC GLASS FURNACE WITH ZONE TEMPERATURE CONTROL

[75] Inventors: Robert W. Holler; Richard E. Rothrock, both of Toledo, Ohio

[73] Assignee: Owens-Corning Fiberglas Corporation, Toledo, Ohio

[22] Filed: Apr. 19, 1973

[21] Appl. No.: 352,833

Related U.S. Application Data

[63] Continuation-in-part of Ser. No. 273,063, July 19, 1972, abandoned.

[52] U.S. Cl. ................................................ 13/6
[51] Int. Cl. ............................................ C03b 5/02
[58] Field of Search .................................. 13/6, 24

[56] References Cited
UNITED STATES PATENTS

| | | | |
|---|---|---|---|
| 3,349,160 | 10/1967 | Rapson | 13/6 X |
| 3,395,237 | 7/1968 | Orton | 13/6 |
| 3,600,149 | 8/1971 | Chen et al. | 13/6 X |
| 3,636,227 | 1/1972 | McQuaid | 13/6 |
| 3,683,093 | 8/1972 | Gell | 13/6 |

*Primary Examiner*—Roy N. Envall, Jr.
*Attorney, Agent, or Firm*—Staelin & Overman

[57] ABSTRACT

An improved furnace for electrically heating material such as molten glass. At least one and, preferably, a plurality of controlled thermal zones are established transverse to the direction of glass flow through the furnace. For each thermal zone, at least two electrical circuits supply power to at least three submerged electrodes for heating the glass. A control circuit is provided to maintain substantially constant the square of the average current in each circuit. If a predetermined permissible temperature variation is exceeded in the molten glass in any thermal zone, power to all electrodes for such thermal zone is either reduced or interrupted. The thermal zones may also be interdependent for maintaining a desired temperature profile in the material flow direction.

15 Claims, 5 Drawing Figures

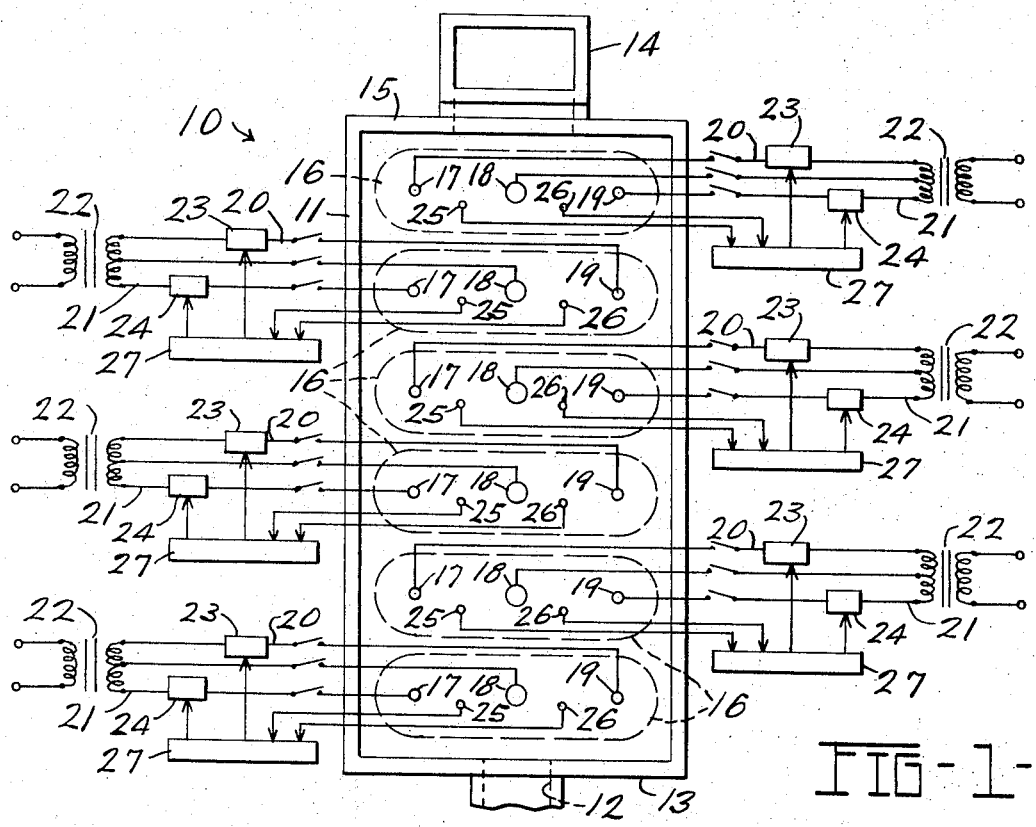
FIG-1-
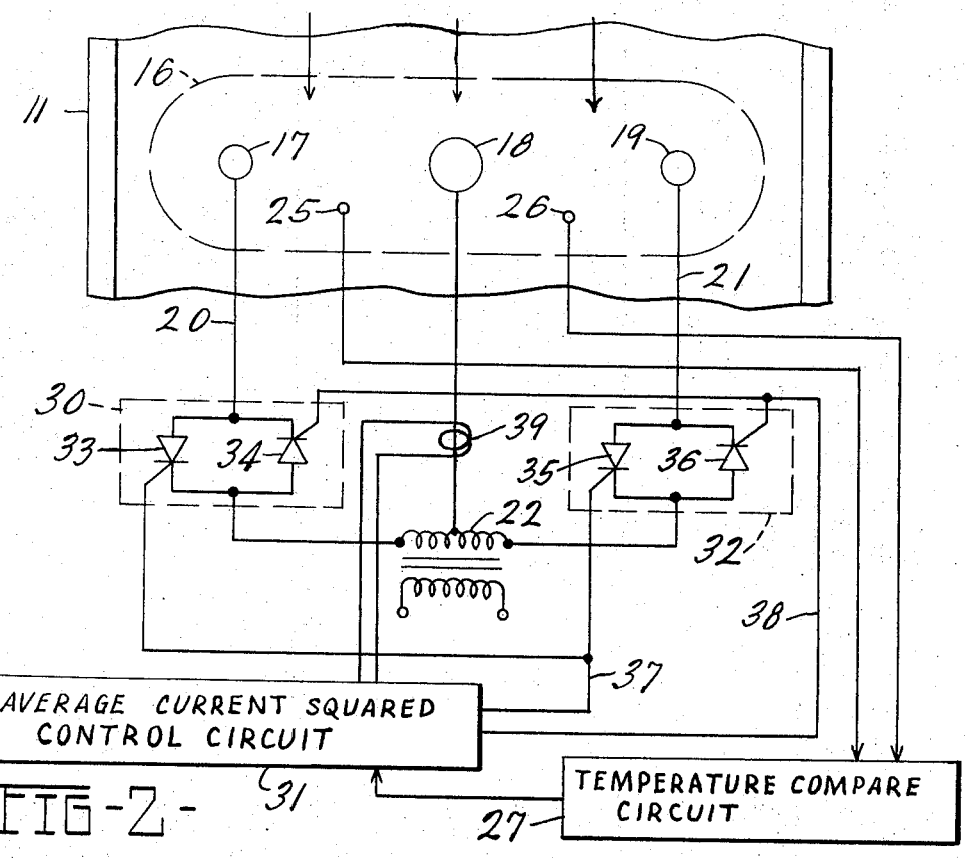
AVERAGE CURRENT SQUARED CONTROL CIRCUIT
TEMPERATURE COMPARE CIRCUIT
FIG-2-

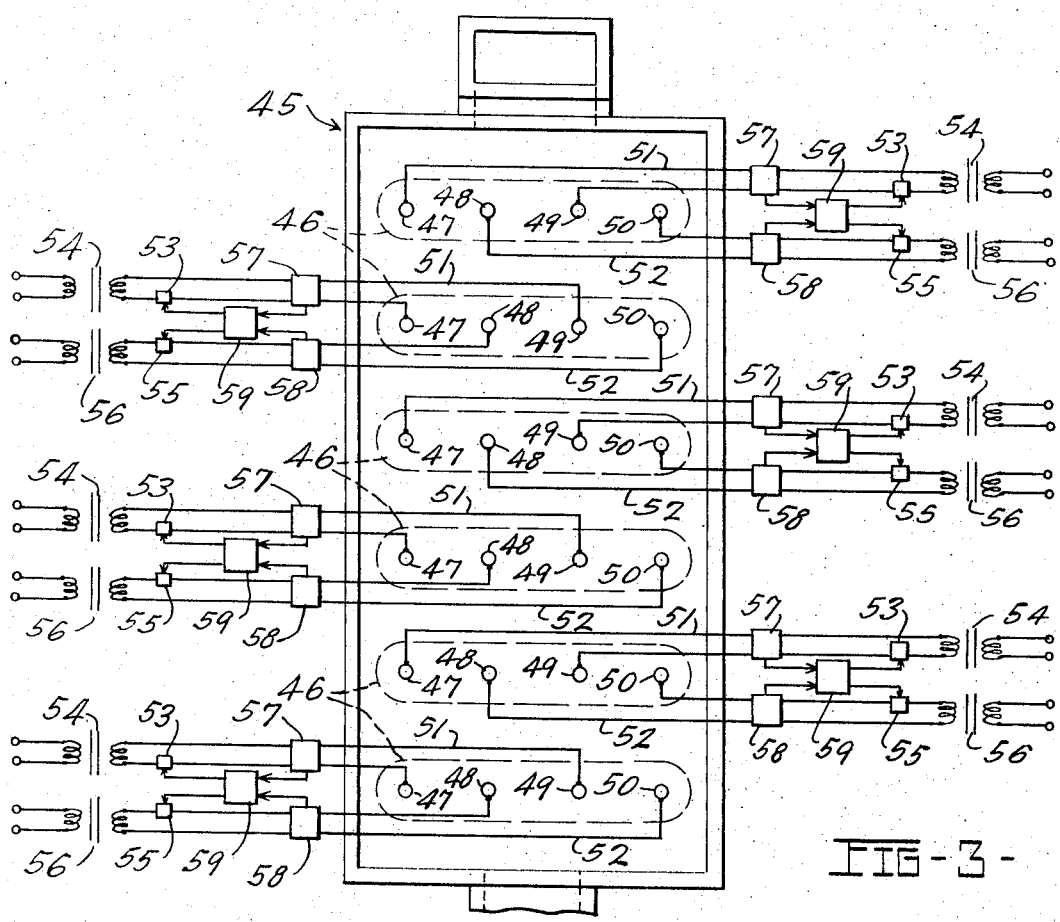
FIG-3-
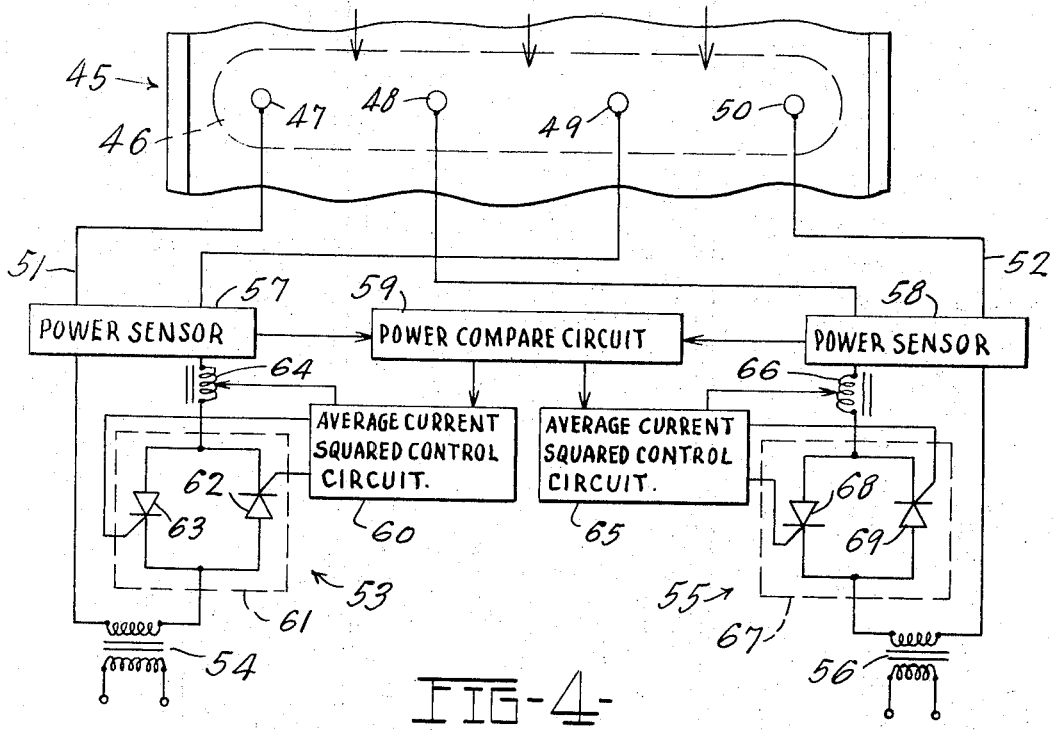
FIG-4-

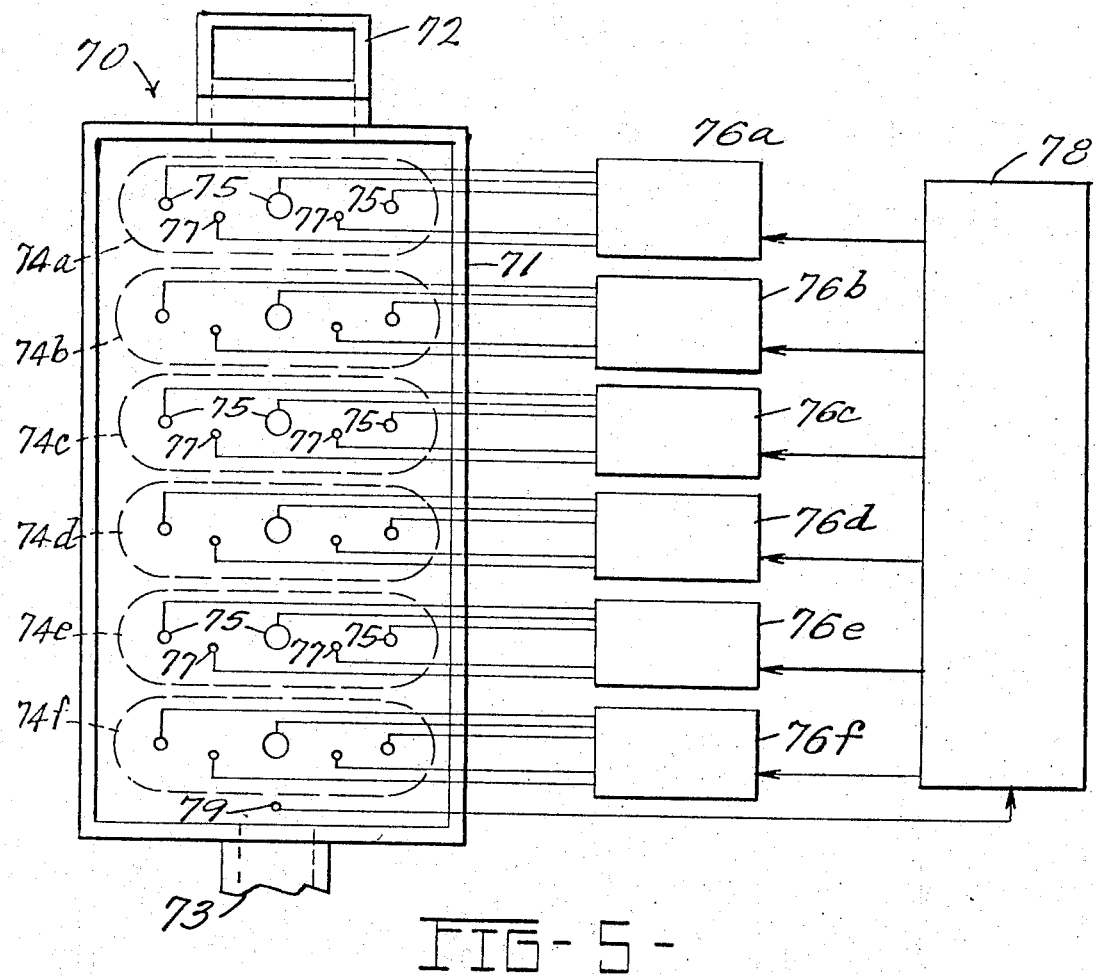
FIG-5-

ELECTRIC GLASS FURNACE WITH ZONE TEMPERATURE CONTROL

CROSS REFERENCE TO RELATED APPLICATION

This is a continuation-in-part of our copending application Ser. No. 273,063, filed July 19, 1972, now abandoned.

BACKGROUND OF THE INVENTION

This invention relates to electric furnaces and more particularly to an improved electric furnace for heating molten glass and the like through the Joule effect which includes zone temperature control.

Until recent years, it has been impractical to heat many materials such as molten glass in an electric furnace by passing a current through the material. Problems occur in electrically heating molten glass through the Joule effect as a consequence of temperature instability caused by the negative temperature coefficient of resistance of molten glass. As molten glass is heated by the passage of an electric current therethrough, the resistance of the glass drops. This in turn will cause an increase in current unless the current is regulated.

It is extremely important to maintain the temperature of molten glass at desired levels as it flows through an electric glass furnace. If the glass on one side of the furnace should become too hot, the lowered viscosity of the glass will cause channelization and non-uniform glass may be discharged from the furnace. If a "hot spot" in a furnace becomes sufficiently intense, the glass may blister and seed. The hot spot will also affect the temperature profile in the flow direction of the molten glass. In one common design for glass furnaces, raw glass batch is delivered to one end of the furnace to the surface of a body of molten glass and molten glass is removed at the opposite end of the furnace. As the glass batch is melted and the molten glass flows through the furnace, a specific temperature profile should be maintained in the flow direction. The molten glass should be heated to a predetermined high temperature as it flows through the middle region of the furnace to assure that all of the batch material is completely melted and to assure uniformity in the glass removed from the furnace. However, the molten glass should be somewhat cooler as it flows from the furnace. It is desirable to maintain a specific output temperature in order to maintain a desired viscosity in the glass flowing from the furnace. The output temperature, and hence the viscosity of the molten glass, can be affected either by a hot spot at an upstream location in the furnace or by an unbalanced condition caused by a failure of only a portion of the heating system.

The temperature stability problem in electrically heating molten glass was recognized in U.S. Pat. No. 3,395,237 to Orton. In this patent, a number of electrode pairs are positioned in a furnace for the passage of current through molten glass. The square of the average current supplied to each electrode pair is regulated to a substantially constant level, regardless of the temperature or resistance of the molten glass between the electrode pairs. It is well known that the power dissipated by a conductor is equal to the square of the current passed through the conductor times the resistance of the conductor. By maintaining substantially constant the square of the average current or the root means square of the current, the power dissipated in molten glass between a pair of spaced electrodes is proportional to the resistance of the molten glass. Thus, by maintaining the square of the average current constant, the applied power will decrease as the resistance of the molten glass decreases from an increase in glass temperature. Conversely, the applied power will increase as the resistance of the glass increases as a consequence of a decrease in glass temperature. With all other factors constant, the temperature of the molten glass will tend to be constant when the square of the average applied current is maintained constant.

Hot or cold spots may occur in an electric glass furnace even though the power supplied to each pair of electrodes is regulated. If, for example, one electrode should fail, a cold spot or area colder than desired will occur in the glass adjacent this electrode. The cold spot may be sufficient to affect the quality or uniformity of glass produced in the furnace. When, for example, the molten glass is to be flowed through a small diameter orifice and attenuated into a fiber, the quality and uniformity of the glass and the temperature dependent viscosity of the glass are extremely important.

SUMMARY OF THE INVENTION

According to the present invention, an improved electric furnace is provided for heating materials such as molten glass. The furnace includes controls which regulate electrical power supplied for heating the glass to reduce the hazard of hot or cold spots in the molten glass. The furnace includes a container for holding the glass as it is heated. The container is filled with molten glass to a predetermined level and a premixed batch of charge material is supplied to the surface of the molten glass at one end of the container to maintain the molten glass level substantially constant. The molten glass is then removed at a remote or opposite end of the container.

Submerged within the molten glass are a plurality of electrodes. The electrodes are arranged in rows extending transverse to the direction of flow of the molten glass. Each electrode row defines a separate thermal zone when electric power is supplied to the electrodes for heating the glass. The power is preferably controlled such that the square of the average current or the root means square of the current remains constant for each pair of electrodes. The glass temperatures at a plurality of locations within each thermal zone are monitored and compared to each other. Should a permissible temperature variation be exceeded in any thermal zone, power is reduced or totally removed from all electrodes within the thermal zone or otherwise controlled to eliminate any undesirable temperature variation in the direction transverse to the flow direction. Removal of the power from any zone will cause the temperature of the glass passing through such zone to drop. As a consequence of the negative temperature coefficient of the molten glass, the temperature drop will increase the resistance of the molten glass. In the next thermal zone through which the glass passes, the higher glass resistance will result in the application of a higher power to cause a uniform increase in the glass temperature at a higher rate to compensate for the removed power. This tends to bring the glass temperature back to normal level. In addition, the thermal zones may be interdependently controlled to compensate for the failure of one or more thermal zones.

Accordingly, it is a preferred object of the invention to provide an improved electric furnace for heating molten materials.

Another object of the invention is to provide an improved furnace for electrically heating molten glass by the Joule effect.

Still another object of the invention is to provide an improved electric furnace having a zone temperature control.

Other objects and advantages of the invention will become apparent from the following detailed description, with reference being made to the accompanying drawings.

BRIEF DESCRIPTION OF THE DRAWINGS

FIG. 1 is a diagrammatic plan view of one embodiment of an electric furnace for heating molten glass, constructed in accordance with the present invention;

FIG. 2 is a schematic block diagram of a power control circuit for use in the electric furnace of FIG. 1;

FIG. 3 is a diagrammatic plan view of a modified embodiment of an electric furnace for heating molten glass, constructed in accordance with the present invention;

FIG. 4 is a schematic block diagram of a power control circuit for use with the electric furnace of FIG. 3; and FIG. 5 is a diagrammatic plan view of a further modified embodiment of the electric furnace of FIG. 1 including a control for maintaining a desired temperature profile in a flow direction of molten glass being heated.

DESCRIPTION OF THE PREFERRED EMBODIMENTS

Turning now to the drawings and particularly to FIG. 1, an improved furnace 10 is shown for heating molten materials such as glass. Although in the subsequent discussion the furnace will be described specifically for heating molten glass, it will be appreciated that other materials which have a sufficiently low resistance for heating in electric furnaces may also be heated within the furnace 10. The furnace 10 generally comprises a container 11 through which the molten glass flows. An outlet 12 is provided at one end 13 of the container 11 for removing the heated molten glass. The outlet 12 is preferably submerged below the normal surface level of the molten glass to prevent the entrance of unmelted batch floating on the surface. A batch charger 14 is provided at an opposite end 15 of the container 11. It will be understood however that supply of batch at one end of the container 11 is exemplary and that the batch may be supplied to any of a number of regions above the surface including distribution over the entire surface. The batch charger 14 supplies a blanket of unmelted batch material to the surface of the molten glass within the container 11 to maintain a constant surface level.

The molten glass within the container 11 continuously flows in from the batch charger 14 to the outlet 12. A plurality of thermal zones 16 are established within the container 11 to extend in a direction transverse to the direction of flow of the molten glass through the container 11. Additional heat is supplied to the molten glass within each thermal zone 16. As the additional heat is added to the molten glass, the temperature of the glass is increased as it flows towards the outlet 12.

At least three electrodes are positioned within each thermal zone 16 for supplying electrical power to the molten glass to heat the glass through the Joule effect. Three electrodes 17-19 are shown located within each thermal zone 16 in the embodiment of the furnace 10 shown in FIG. 1. Electrical power is supplied to the molten glass in a zone 16 through a first circuit 20 including the electrodes 17 and 18 and through a second circuit 21 including the electrodes 18 and 19. The electrode 18 is common to both circuits in the embodiment of FIG. 1.

A center tapped transformer 22 is shown for supplying alternating current power to the first and second circuits 20 and 21, although two separate transformers may also be used. The center tap of the secondary winding on the transformer 22 is connected to the common electrode 18 and the ends of the secondary winding are connected to the other electrodes 17 and 19. A current controlling circuit 23 is connected in series with the lead from the transformer 22 to the electrode 17 and a current controlling circuits 24 is connected in series between the transformer 22 and the electrode 19. The circuits 23 and 24 are preferably adapted to maintain substantially constant the values of the square of the average currents or the root mean square currents in the first and second circuits 20 and 21. As used herein, controlling the square of the average current shall be construed as the same as controlling the root means square of the current.

A temperature sensor 25, such as a thermocouple or an infrared sensor, is positioned to sense the temperature of the molten glass at a position between and slightly downstream of the electrodes 17 and 18. A similar temperature sensor 26 is positioned to sense the temperature of the molten glass between and slightly downstream of the electrodes 18 and 19. A compare circuit 27 for each zone 16 compares the levels of the sensed temperatures for the corresponding zone. Upon the occurrence of the temperature variation between the temperatures sensed by the sensors 25 and 26 exceeding a permissible level, the compare circuit 27 will reduce or, preferably, interrupt current in the first circuit 20 and in the second circuit 21 to either reduce or totally remove all power applied to the molten glass within the thermal zone 16. With all power removed from a zone 16, the glass will cease to be unevenly heated within the thermal zone.

When power is interrupted within one of the thermal zones 16 due to the occurrence of a predetermined temperature variation within such thermal zone, the molten glass entering the next thermal zone will be cooler than normal. Since the glass is cooler, it will have a higher resistance and additional power will be supplied to the molten glass within the subsequent thermal zones to increase the heating rate in these zones. The power change is a consequence of the fact that when the root mean square of the current supplied to the glass is maintained constant, the average power supplied to the glass is proportional to the resistance of the glass which is in turn a function of the glass temperature.

The first and second current controlling circuits 23 and 24, the transformer 22 and the temperature compare circuit 27 are duplicated for each thermal zone 16. In addition, the actual number of control circuits 23 and 24 and transformers 22 will depend upon the number of electrodes within each thermal zone 16. To meet the power restrictions of the utility companies, the transformers 22 are preferably distributed equally on the three legs of a three phase power circuit. In addition, two transformers may be substituted for the single transformer 22 shown in FIG. 1 with the secondary winding of one transformer supplying power to the first circuit 20 and the secondary winding of the other transformer supplying power to the second circuit 21.

Referring to FIG. 2, a more detailed block diagram is shown for the controls for a single thermal zone 16 in the furnace 10. The first current controlling circuit 23 includes switch means 30 and a control circuit 31 for maintaining the root mean square of the current through the switch means 30 substantially constant, while the second current controlling circuit 24 includes switch means 32 and also the control circuit 31. The control circuit 31 may be, for example, of a type shown and disclosed in U.S. Pat. No. 3,395,237 to Orton. The disclosure of the Orton patent is incorporated herein. The swtiching means 30 includes a pair of silicon controlled rectifiers 33 and 34 connected in parallel and arranged back-to-back and the switching means 32 includes a pair of silicon controlled rectifiers 35 and 36 also connected in parallel and arranged back-to-back. However, it will be appreciated that other types of switches may be used in place of the controlled rectifiers 33–36. The control circuit 31 has a pulsed outut 37 for firing the rectifiers 33 and 35 and a second pulsed output 38 for firing the rectifiers 34 and 36.

The average current squared control circuit 31 may produce two types of timed pulse trains at the outputs 37 and 38 for firing the rectifiers 33–36. In one type of output, one rectifier in each of the first and second circuits 20 and 21 is fired during each half cycle of the power applied from the secondary winding of the transformer 22. The phase or time in each cycle at which the rectifiers are fired is controlled to maintain substantially constant the value of the root mean square or simply the square of the average current to the electrodes 17–19. A feedback signal may be provided to the control circuit 31 by means of one or more current transformers 39 which measure the current flow to the electrodes 17–19. In a second type of control operation, the control circuit 31 periodically turns on and off the rectifiers 33–36 such that the root mean square or square of the average of the current is maintained constant only over a period of time. The rectifiers 33-36 may, for example, be turned on for one or more cycles of the power from the secondary of the transformer 22 and, subsequently, turned off for a time period of one or more cycles.

The temperature sensors 25 and 26 are connected to the compare circuit 21, which may be a conventional circuit for comparing either a plurality of analog or digital signals, depending upon the type output from the sensors 25 and 26. The compare circuit 21 is designed to provide one output when the sensed temperatures lie within a permissible tolerance range and a second outut when the difference between the sensed temperatures exceeds the permissible tolerance. When the permissible tolerance is exceeded, a signal is applied to the control circuit 31 either to selectively reduce or increase or to totally inhibit firing of the rectifiers 33–36, thereby controlling power to the electrodes 17–19 for preventing an unbalanced condition in the molten glass.

Turning now to FIG. 3, a modified embodiment of a glass melting furnace 45 is shown. The modified furnace 45 includes a plurality of thermal zones 46 also spaced longitudinally with the direction of flow of the molten glass and extending transverse to the direction of glass flow. In the thermal zone in the furnace 45, four electrodes 47–50 are mounted in a row for supplying electrical energy to the molten glass for heating the glass. However, it will be appreciated that three or more electrodes may be positioned in each thermal zone 46, depending upon the width of each thermal zone 46 and the amount of power supplied to the glass in each thermal zone 46.

The electrodes 47 and 49 are connected to a first circuit 51 which supplies electrical power for heating the molten glass between the electrodes 47 and 49 and the electrodes 48 and 50 are connected to a second circuit 52 which supplies power for heating the molten glass between the electrodes 48 and 50. The first circuit 51 includes current controlling circuit 53 and a power transformer 54. The second circuit 52 similarly includes a current controlling circuit 55 and a power transformer 56. The current controlling circuits 53 and 55 are designed for maintaining substantially constant the square of the average current delivered to the electrodes 47–50. As previously stated, when the square of the average current is maintained substantially constant in a circuit, the average power actually delivered to the electrodes is a function of the resistance of the molten glass, which is in turn a function of temperature of the glass. By measuring the average power delivered to the molten glass in the first circuit 51 and in the second circuit 52, signals may be obtained which are functionally related to the temperature of the glass between the pair of electrodes 47 and 49 for the first circuit 51 and the pair of electrodes 48 and 50 for the second circuit 52.

A circuit 57 is provided for measuring the power delivered to the electrodes 47 and 49 in the first circuit 51 and a circuit 58 is provided for measuring the power delivered to the electrodes 48 and 50 by the second circuit 52. The outputs of the power measuring circuits 57 and 58, which are functionally related to temperatures of the glass in the thermal zone 46, are connected to a compare circuit 59. In the event that a predetermined permissible variation between the sensed temperatures is exceeded, as indicated by a variation in the powers measured by the circuits 57 and 58, the compare circuit 59 will reduce or inhibit the current in the circuits 51 and 52.

Referring now to FIG. 4, a more detailed block diagram is shown for the first and second circuits 51 and 52. The current controlling circuit 53 for the first circuit 51 includes a circuit 60 for maintaining substantially constant the square of the average current supplied to the electrodes 47 and 49 and switch means 61. The switch means 61 preferably consists of a pair of silicon controlled rectifiers 62 and 63 connected in parallel and arranged back-to-back. The circuit 60 periodically triggers the rectifiers 62 and 63 for controlling the power delivered from the transformer 54 to the electrodes 47 and 49. A current transformer 64 is connected in series with the lead to one of the electrodes 47 or 49 for providing a feedback signal to the circuit 60. Similarly, the current controlling circuit 55 includes a circuit for maintaining substantially constant the square of the average current supplied to the electrodes 48 and 50, a current transformer 66 for providing a feedback signal to the control circuit 65 annd switching means 67 including a pair of silicon controlled rectifiers 68 and 69 which are connected in parallel and arranged back-to-back. As in the embodiment shown in FIGS. 1 and 2, details of the current controlling circuits 53 and 55 may be found in U.S. Pat. No. 3,395,237.

The power sensors 57 and 58 for measuring power delivered to the electrode pairs 47–49 and 48–50, respectively, are of conventional design and, for example, may consist of a circuit similar to watt meter. The outputs from the sensors 57 and 58 are supplied to the compare circuit 59, which in turn controls the circuit 60 and 65. In the event that the glass temperatures between the electrodes 47 and 49 and between the electrodes 48 and 50 differ by more than a permissible limit, as indicated by unequal outputs from the power sensors 57 and 58, the compare circuit 59 generates an output which causes the control circuits 60 and 65 to either reduce or to totally inhibit the switching rate of the rectifiers 62, 63, 68 and 69, thereby reducing or discontinuing current flow to all of the electrodes within the thermal zone 46. A suitable alarm (not shown) also may be controlled from the output of the compare circuit 59 for annunicating that power has been removed from any of the thermal zones 46. In a modified embodiment, the switching rate of the rectifiers 62, 63, 68 and 69 may be selectively controlled to increase the power delivered to electrodes in any cool portion of a thermal zone 46.

When power is removed from one of the thermal zones 46, the temperature of the molten glass leaving that thermal zone will be reduced below a desired level. Reducing the temperature of the molten glass causes an increase in the glass resistance and, as a consequence, additional power will be supplied to the molten glass as it passes through thermal zones downwstream of that thermal zone. Thus, the thermal zones inherently become interdependent due to the resistance of the melting glass and the temperature profile of the glass will tend to be maintained substantially constant in the glass flow direction, even though, for example, one or more electrodes should fail within the furnace 45.

Turning now to FIG. 5, still another embodiment of an electric furnace 70 is shown. The furnace 70 is similar to the furnace 10 of FIGS. 1 and 2 and the furnace 45 of FIGS. 3 and 4 with the addition of means for establishing an interdependence between the successive thermal zones for maintaining a desired temperature profile in the flow direction in the molten glass or other material being heated in the furnace 70. In the past, glass furnaces having a control over the temperature profile in the flow direction have been of the type in which flames from fuel burners spaced in the flow direction are directed at the surface of the molten glass. Such prior art controls are shown, for example, in U.S. Pat. No. 3,482,956 to Trethewey.

As in the prior embodiments, the furnace 70 includes a container 71 for holding the molten material during heating. A batch charger 72 charges raw batch materials into one end of the container 71, while the heated molten material is removed at an outlet 73 at an opposite end of the container 71. A number of thermal zones 74 are established within the container 71, each extending in a direction transverse to the glass flow direction. Although only six thermal zones 74 are shown, it will be appreciated that either additional or fewer thermal zones may be established within the container 71, depending upon the requirement for heating specific materials. The six thermal zones have been labeled 74a for the zone adjacent the batch charger 72 through 74f for the zone adjacent the outlet 73. Electrical power is applied to the molten glass in each thermal zone 74 through at least three electrodes 75. The electrodes 75 are spaced in a direction transverse to the flow direction of the molten glass so that the glass is heated uniformly in the transverse direction to minimize the occurrence of hot spots or channelization due to viscosity variations. The electrodes 75 for each of the thermal zones 74a through 74f are connected to power sources and controls 76a through 76f, respectively. Each of the power sources and controls 76 may be of the type shown in FIG. 1 and may include the transformer 22, the power control circuits 23 and 24 and the temperature comparison circuit 27. Or the power sources and controls may be similar to those shown in FIGS. 3 and 4. If the controls 76 are the type shown in FIGS. 1 and 2, a plurality of temperature sensors 77 are associated with each thermal zone 74 and are spaced in a direction transverse to the glass flow direction for sensing the temperature of glass after it is heated in each thermal zone 74.

In, for example, heating molten glass which is to be used for forming glass fibers, the consistency and the viscosity of the glass leaving the furnace 70 is extremely critical. The glass consistency and viscosity are affected by the temperature history of the heated glass or by the temperature profile in the glass flow direction in the container 71. It may, for example, be desirable to heat the molten glass to 2350°F. in the initial thermal zones 74a and 74b. As the molten glass subsequently flows through the central region of the container 71, the molten glass may be heated to 2450°F. to form a "heat hump". In this region, high temperature assures that the raw glass batch is completely melted and that the molten glass is of a uniform consistency. The temperature of the molten glass is usually lowered in the final thermal zone 74e and 74f until the glass reaches the temperature of perhaps 2250°F. at the outlet 73. The actual outlet temperature, of course, will depend upon the actual composition of the glass or other material being heated and generally must be accurately controlled for establishing the viscosity of the glass needed for the subsequent forming operation.

As indicated above in the descriptions of the furnace embodiments of FIGS. 1–4, the actual amount of power supplied from the controls 76 to the electrodes 75 is controlled by control circuits which may be the type disclosed in the Orton U.S. Pat. No. 3,395,237. The Orton control circuit includes a manual control which initially establishes the magnitude of the square of the average current or the root means square of the current supplied to the electrodes 75. Such manual controls may be located in a temperature profile control circuit 78 which is connected to each of the power sources and controls 76a through 76f. The profile control 78 may include a manual control for initially establishing the temperature to which the molten glass is heated in each of the thermal zones 74a through 74f. Setting the manual controls, in effect, establishes the ratio between the levels of currents delivered to the electrodes 75 in each of the thermal zones 74a through 74f.

A temperature sensor 79 may be positioned adjacent the furnace outlet 73 for monitoring the critical outlet temperature. The temperature sensor 79 supplies a control signal to the profile control 78. The profile control 78 may then uniformly raise or lower the power supplied to all of the thermal zones 74a through 74f for maintaining constant the temperature of the glass at the outlet 73. In the event of a failure in one of the thermal zones 74a through 74f, the associated power source and control 76 may reduce or totally remove power from such zone. In this event, the profile control 78 may then uniformly increase the square of the average current or the root means square of the current supplied to the electrodes 75 in all of the remaining thermal zones for maintaining the desired glass temperature at the outlet 73. Thus, the thermal zones 74a through 74f are made interdependent by means of the profile control 78.

It will be appreciated that various changes and modifications may be made in the above-described furnace and related control circuits without departing from the spirit and the scope of the claimed invention.

What we claim is:

1. An electric furnace for heating a flowing molten material by the Joule effect comprising, in combination, a container for the molten material, at least one thermal zone extending within the material in the container in a direction transverse to the material flow direction, means comprising at least two electric circuit means for said one zone including electrodes for supplying electric power to the molten material, means mounting said electrodes for electrical contact with the material in said one zone with said electrodes spaced in a direction transverse to the material flow direction, and means responsive to a predetermined temperature difference in a direction transverse to the material flow direction in said one thermal zone for controlling power in all of said circuit means which supply power to all of said electrodes in said one thermal zone.

2. An electric furnace for heating a molten material, as set forth in claim 1, wherein said power controlling means interrupts power to all electrodes in said on thermal zone in response to the predetermined temperature difference in said one thermal zone.

3. An electric furnace for heating a molten material, as set forth in claim 1, wherein each of said electric circuit means includes control means for maintaining substantially constant the value of the root mean square of the current supplied to the material through said electrodes.

4. An electric furnace for heating a molten material, as set forth in claim 3, wherein said at least two circuit means each includes a pair of said electrodes for supplying power to the molten material, a power source, and means connecting said power source, said pair of electrodes and said circuit control means in series.

5. An electric furnace for heating a molten material, as set forth in claim 3, wherein each of said circuit control means includes switch means for periodically interrupting power flow from said power source to said electrodes.

6. An electric furnace for heating a molten material, as set forth in claim 5, wherein said power controlling means includes a plurality of temperature sensors, means positioning said temperature sensors to measure the relative temperature of the molten material at a plurality of points sapced within said one thermal zone downstream of said electrodes and transverse to the material flow direction, and means for comparing such sensed temperatures.

7. An electric furnace for heating a molten material, as set forth in claim 3, wherein said power controlling means includes means for measuring the average powers supplied to the molten material through each of said circuit means, such powers being a function of the temperature of the molten material being heated by said circuit means, and means for comparing such measured powers.

8. An electric furnace for heating molten glass by the Joule effect and in which the molten glass flows in a direction transverse to a plurality of thermal zones within the molten glass comprising, in combination, a container for holding the molten glass during heating, at least three electrodes for one of the thermal zones, means mounting said electrodes for electrical contact with the molten glass in said one thermal zone with said electrodes spaced transversely to the glass flow direction, a plurality of power supply circuits, at least two for supplying power to said at least three electrodes, and means responsive to a predetermined temperature difference in a direction transverse to the glass flow direction in said one thermal zone for controlling power to all of said electrodes in said one thermal zone.

9. An electric furnace for heating molten glass, as set forth in claim 8, wherein said power controlling means simultaneously interrupts power to all electrodes in said one thermal zone in response to the predetermined temperature difference in said one thermal zone.

10. An electric furnace for heating molten glass, as set forth in claim 9, and including second control means for maintaining substantially constant the value of the root mean square of the current supplied through said electrodes to the glass in said one thermal zone.

11. An electric furnace for heating molten glass, as set forth in claim 10, wherein said power controlling means includes a plurality of temperature sensors, means positioning said temperature sensors to measure the relative temperature of the molten glass at a plurality of points spaced within said one thermal zone downstream of said electrodes and transverse to the material flow direction, and means for comparing such sensed temperature.

12. An electric furnace for heating molten glass, as set forth in claim 10, wherein said power controlling means includes means for measuring the average power supplied to the molten glass by said power supply circuits, such powers being a function of the temperature of the molten glass to which the power is supplied, and means for comparing such measured powers.

13. An electric furnace for heating a flowing molten material by the Joule effect comprising, in combination, a container for the molten material, a plurality of thermal zones each extending within the material in a direction transverse to the direction of material flow, means comprising at least two electric circuit means for each of said thermal zones and including electrodes for supplying electric power to the molten material, means mounting said electrodes for electrical contact with the material in each of said zones with said electrodes spaced in a direction transverse to the material flow direction, and means for each thermal zone for interdependently controlling power in all of said circuit means for such thermal zone separately of the control of the other of said thermal zones.

14. An electric furnace for heating a flowing molten material by the Joule effect comprising, in combination, a container for the molten material, a plurality of thermal zones each extending within the material in a direction transverse to the direction of material flow, means comprising electric circuit means for each of said thermal zones and including electrodes for supplying electric power to the molten material, means mounting said electrodes for electrical contact with the material in each of said zones with said electrodes spaced in a direction transverse to the material flow direction, and means connected for controlling power in all of said circuit means for each one of said thermal zones in an interdependent relation to establish a predetermined temperature profile in the molten material in the flow direction.

15. An electric furnace for heating a flowing molten material, as set forth in claim 14, and including means for each thermal zone for controlling power in said circuit means for such thermal zone separately of the other of said thermal zones.

* * * * *